US012209325B2

(12) United States Patent
Klocke

(10) Patent No.: US 12,209,325 B2
(45) Date of Patent: Jan. 28, 2025

(54) NANOFILTRATION FOR WAFER RINSING

(71) Applicant: Applied Materials, Inc., Santa Clara, CA (US)

(72) Inventor: John L. Klocke, Kalispell, MT (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/176,663

(22) Filed: Mar. 1, 2023

(65) Prior Publication Data

US 2024/0295046 A1 Sep. 5, 2024

(51) Int. Cl.
| | |
|---|---|
| C25D 21/20 | (2006.01) |
| B01D 61/02 | (2006.01) |
| B01D 61/08 | (2006.01) |
| B08B 3/02 | (2006.01) |
| B08B 3/08 | (2006.01) |
| B08B 3/14 | (2006.01) |
| C25D 21/06 | (2006.01) |
| C25D 21/08 | (2006.01) |
| C25D 21/12 | (2006.01) |
| C25D 21/18 | (2006.01) |

(52) U.S. Cl.
CPC ............ C25D 21/20 (2013.01); B01D 61/027 (2013.01); B01D 61/08 (2013.01); B08B 3/02 (2013.01); B08B 3/08 (2013.01); B08B 3/14 (2013.01); C25D 21/08 (2013.01); C25D 21/12 (2013.01); C25D 21/06 (2013.01); C25D 21/18 (2013.01)

(58) Field of Classification Search
CPC ........ C25D 21/06; C25D 21/08; C25D 21/16; C25D 21/18; C25D 21/20
See application file for complete search history.

(56) References Cited

U.S. PATENT DOCUMENTS

| | | | |
|---|---|---|---|
| 2003/0155250 A1* | 8/2003 | Middeke | C25D 21/20 205/163 |
| 2017/0014873 A1 | 1/2017 | Higuchi et al. | |
| 2017/0069513 A1 | 3/2017 | Oh et al. | |
| 2019/0127236 A1 | 5/2019 | Zhou et al. | |
| 2021/0017665 A1 | 1/2021 | Lee et al. | |

FOREIGN PATENT DOCUMENTS

| | | | | |
|---|---|---|---|---|
| WO | WO-2008096166 A2 * | 8/2008 | ........... | B01D 61/025 |
| WO | 2010111291 A2 | 9/2010 | | |

OTHER PUBLICATIONS

International Search Report and Written Opinion mailed on Jun. 21, 2024 in International Patent Application No. PCT/US2024/017073, 9 pages.

* cited by examiner

*Primary Examiner* — Brian W Cohen
(74) *Attorney, Agent, or Firm* — Kilpatrick Townsend & Stockton LLP

(57) ABSTRACT

The present technology includes methods for rinsing an electroplating apparatus, a component thereof, and/or a substrate. The method includes removing at least a portion of a bath solution having a first pH from an electroplating bath. The method includes filtering the removed bath solution through a nanofiltration membrane, forming a permeating containing a recycled rinse agent, and a retentate. The method includes transferring the recycled rinse agent to the one or more nozzles and rinsing the electroplating apparatus, component thereof, and/or substrate. The method includes where the recycled rinse agent is characterized by a second pH, where the second pH varies from the first pH by less than or about 5.

20 Claims, 4 Drawing Sheets

NANOFILTRATION FOR WAFER RINSING

TECHNICAL FIELD

The present technology relates to cleaning operations in semiconductor processing. More specifically, the present technology relates to systems and methods for recycling residues and rinse agents from electroplating systems and components thereof.

BACKGROUND

Integrated circuits are made possible by processes which produce intricately patterned material layers on substrate surfaces. After formation, etching, and other processing on a substrate, metal or other conductive materials are often deposited or formed to provide the electrical connections between components. Because this metallization may be performed after many manufacturing operations, problems caused during the metallization may create expensive waste substrates or wafers. One issue during plating is residue buildup on the contact seal against which the substrate may be seated and undeposited precursors remaining on substrate surfaces.

During formation of metal materials on a wafer or substrate, a substrate may be submerged within a plating bath followed by metal formation on the substrate. The wafer may be subsequently raised and then rinsed at the chamber. The rinse may use water that may be sprayed across the surface of the substrate and seal. Several issues may occur during this process. For example, water may fall into the plating bath causing dilution and a drop in bath pH, which may cause rinse times to be shortened or be performed differently in an attempt to reduce dilution. In some processing a substrate may be transferred from a first bath solution to a second bath solution to form additional metallization. Splashed bath materials from the first bath may contaminate the second bath when the substrate is delivered.

Thus, there is a need for improved systems and methods that can be used to produce high quality devices and structures. These and other needs are addressed by the present technology.

BRIEF SUMMARY

Embodiments of the present technology include methods for rinsing an electroplating apparatus, a component thereof, or a substrate. The method includes removing at least a portion of a bath solution having a first pH from an electroplating bath. The method includes filtering the removed bath solution through a nanofiltration membrane, forming a permeating containing a recycled rinse agent, and a retentate. The method includes transferring the recycled rinse agent to the one or more nozzles and rinsing the electroplating apparatus, component thereof, and/or substrate. The method includes where the recycled rinse agent is characterized by a second pH, where the second pH varies from the first pH by less than or about 5.

In embodiments, the retentate contains one or more electroplating precursor particles. In more embodiments, the precursor particles are copper, tin, gold, nickel, silver, palladium, platinum, rhodium, alloys thereof, ions thereof, or mixtures thereof. In some embodiments, the precursor particles are ions of one or more of tin, tin-copper, tin-silver, tin-silver-copper, tin-bismuth, palladium, or combinations thereof. Additionally, or alternatively, in embodiments, less than about 10 wt. % of the precursor particles precipitate from the plating solution subsequent the rinsing, based upon the weight of the precursor particles in the plating solution prior to rinsing. In embodiments, methods include a second rinsing of the electroplating apparatus, the component thereof, or the substrate, wherein the second rinsing includes the recycled rinse agent or water. In more embodiments, at least a portion of the electroplating precursor particles are returned to the electroplating bath.

Moreover, in embodiments, the filtering occurs at a pressure of greater than or about 50 psi. In embodiments, the nanofiltration membrane is characterized by preventing molecules having a molecular weight of greater than or about 125 g/mol from passing through the nanofiltration membrane. In more embodiments, the nanofiltration membrane is characterized by preventing particles having a size of greater than 1 nanometer from passing through the nanofiltration membrane.

Embodiments of the present technology include where the first pH of the bath solution is from about 0 to about 5, and where the second pH of the permeate is from about 0 to about 5. In embodiments, the second pH varies from the first pH by less than or about 3. In additional embodiments, the second pH varies from the first pH by less than or about 2. Additionally or alternatively, in embodiments, the recycled rinse agent and the bath solution comprise a mineral acid, carbonic acid, or a combination thereof. In more embodiments, the recycled rinse agent is characterized by having a pH of less than 3. In embodiments, the permeate contains less than about 20 wt. % precursor particles or ions thereof, based upon the total weight of solute in the permeate.

Embodiments of the present technology are also generally directed to an electroplating system. The system includes a plating system, a recycling unit, a recycling unit conduit, a first filtration unit retentate conduit, and a first filtration unit permeate conduit. The plating system includes a plating bath containing a bath solution, a head that includes a seal, a substrate coupled with the seal, and at least a first rinse nozzle. In embodiments, the bath solution is characterized by a first pH. The recycling unit includes at least a first filtration unit and a pump, where the first filtration unit is characterized by being a nanofiltration membrane. In the system, the recycling unit conduit fluidly connects the plating bath and the recycling unit, the first filtration unit retentate conduit connects the recycling unit to the plating bath, and the first filtration unit permeate conduit connects the recycling unit to the first rinse nozzle. In embodiments, the permeate is characterized by a second pH, where the second pH varies from the first pH by less than or about 5.

In embodiments, the system includes at least one valve on one or more of the recycling unit conduit, first filtration unit permeate conduit, first filtration unit retentate conduit, or a combination thereof. In further embodiments, the system includes a controller and a non-transitory computer readable medium having instructions stored thereon.

Embodiments of the present technology are also generally directed to a method for rinsing an electroplating apparatus, a component thereof, and/or a substrate. The electroplating apparatus includes a plating bath containing a bath solution having a first pH, a head having a seal, a substrate coupled with the seal, and at least a first rinse nozzle. The method includes moving the head from a first position to a second position, removing all or a portion of a bath solution having a first pH from an electroplating bath, and filtering the bath solution through a nanofiltration membrane, forming a permeate containing recycled rinse agent and a retentate. In the method, the recycled rinse agent is transferred to one or more nozzles, and utilized to rinse the head, the seal, or a combination thereof. In the method, the recycled rinse agent is characterized by a second pH, where the second pH varies from the first pH by less than or about 5.

Such technology may provide numerous benefits over conventional technology. For example, the present technology may provide improved cleaning by utilizing a rinse agent capable of providing a more controlled cleaning of system seals and wafers without negatively impacting the bath balance. Additionally, methods and systems of the present technology may provide for the recycling of bath components, reducing waste and improving the ability to maintain bath balance. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
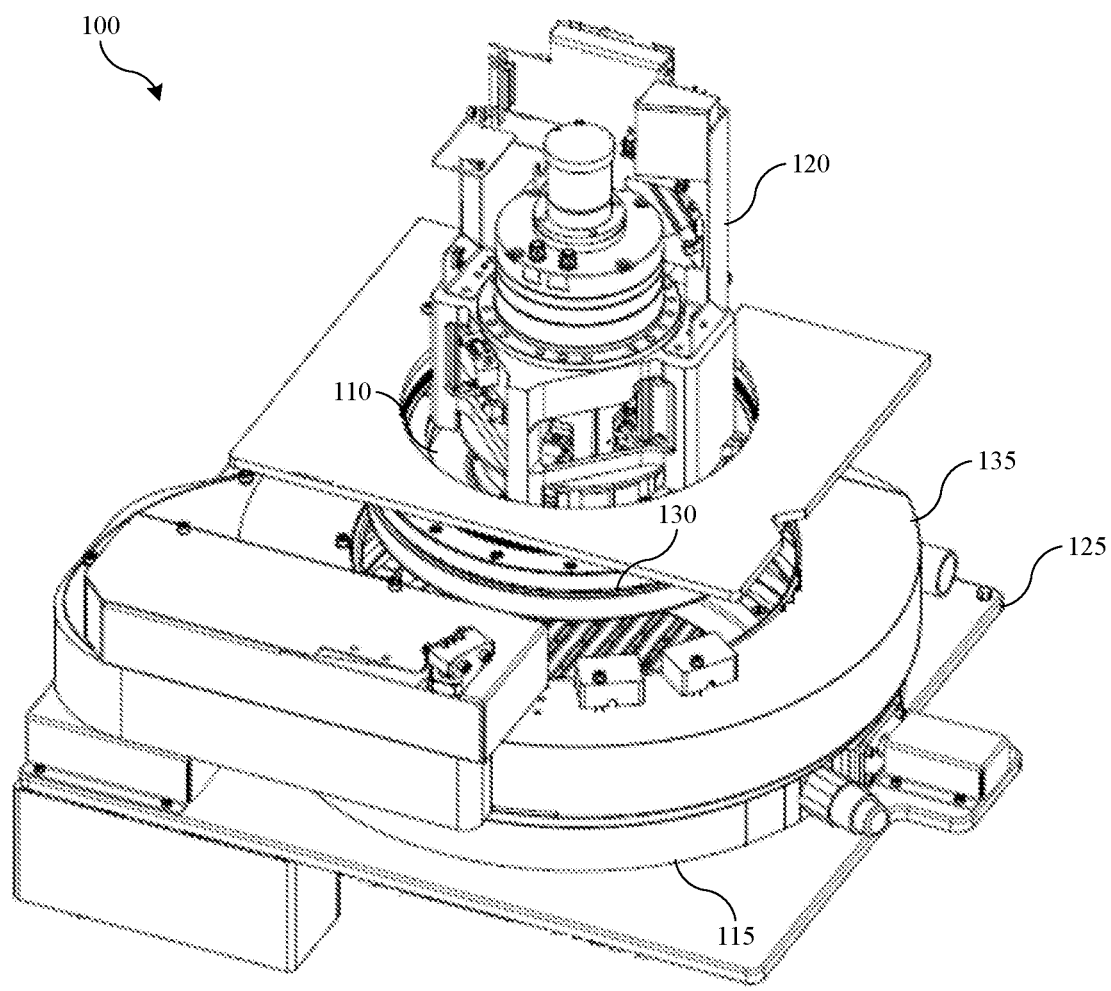
FIG. 1 shows a schematic perspective view of a chamber on which cleaning technology may be coupled according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Electroplating operations may be performed to provide conductive material into vias and other features on a substrate. Electroplating utilizes an electrolyte bath containing ions of the conductive material to electrochemically deposit the conductive material onto the substrate and into the features defined on the substrate. The substrate on which metal is being plated operates as the cathode. An electrical contact, such as a ring or pins, may allow the current to flow through the system. During electroplating, a substrate may be clamped to a head and submerged in the electroplating bath to form the metallization. In systems as described below, the substrate may also be chucked within a seal that may be coupled with the head during processing. When the substrate is raised after plating, it may be rinsed with water, such as deionized water, combined with cleaning chemicals prior to being sent to another plating chamber or some other processing location. However, as noted above, several issues may occur during this rinsing operation.

Conventional technologies may rinse the substrate directly over the bath from a nozzle that ejects rinsing fluid from a side of the chamber towards a center of the substrate. The substrate may be rotated at some speed during the rinsing, which may draw the water across the substrate and sling the water into a catch located at an exterior of the chamber. During the delivery, water may fall into the electrolyte bath, diluting the bath and potentially splashing solution up onto the wafer. This may bring electrolyte or cleaning chemicals to a subsequent bath having a different solution, which may contaminate the second bath. Attempts to utilize acidified rinse agents have also proven problematic. Namely, as such rinse agents introduce additional acid to the bath, the bath falls out of control due to over-acidification.

Moreover, existing bath are operated with bath solutions having non-neutral pH values, such as less than 4 or greater than 8. Conversely, conventional rinse or cleaning systems utilize neutral pH water as a rinse agent. However, neutral pH water problematically leads to the formation of insoluble contaminants, such as organometallics, metallics, and the like in the bath, that plate-up or form scale upon bath surfaces and components. Namely, particles that were soluble in the pH of the bath prior to dilution, can be forced to precipitate from solution due to the change in pH from the introduction of the rinse agent, and then adhere to whatever surface is available. On a single occurrence, insoluble deposits are virtually negligible. But on surfaces which are repeatedly exposed to cleaning agents having a higher or lower pH, each cycle can create insoluble deposits which will build up as cycling progresses. Eventually the deposits can form a conductive or semi-conductive film which acts as a precursor to plate-up.

Additionally, plating chambers may accommodate multiple substrate sizes, and thus, for example, a 200 mm semiconductor wafer and a 300 mm semiconductor wafer may be processed in the same chamber. During the sling operation, the smaller diameter 200 mm wafer may not fully deliver rinse fluid into the catch, which may cause the rinse fluid to be delivered into the electrolyte bath. This may cause more substantial dilution of the bath, which may limit the amount of rinsing that may be performed. Further, valuable bath solutes are often contained in the cleaning agent utilized during rinsing. In conventional systems, there is currently no mechanism for recovering lost bath solutes.

The present technology overcomes these issues by incorporating a recycling system that provides a rinse agent having a preselected pH filtered from the bath solution, preventing pH dilution of the bath, oversaturation by acid, and precipitation of bath solutes. In addition, by utilizing such a filtration system, the present technology has found that bath solutes can be separated from the recycled rinse agent and bath solution and returned to the bath, reducing waste, and preventing contamination of the seal, bath, and/or substrate by the recycled rinse agent. Moreover, the filtration system according to the present technology also provides for the production of a rinse agent recycled from the bath solution having a specific pH that varies from the bath solution pH by less than or about 5 without the need for additional cleaning agents. Namely, careful selection of filters allows both the separation of bath solutes from the recycled bath solution, and the formation of a rinse agent having the preselected pH. The preselected pH allows for excellent cleaning and removal of unused bath solutes on seals and substrates without additional cleaning agents. Such a rinse agent can therefore be either further recycled as a rinse agent or retained in the bath after rinsing, as contamination and dilution concerns have been reduced or even eliminated. In addition, as the rinse agent is recycled from the bath solution, and carefully tailored to exhibit a similar pH to the bath solution pH without additional pH adjusting agents, negative increases and decreases in pH and electrolyte concentration can be avoided. Furthermore, the present technology has unexpectedly found that the filtration system can be operated as an in situ filtration system, allowing the continuous collection, filtration, and recycling of bath solutions to form recycled rinse agents.

By utilizing cleaning systems according to the present technology, cleaning may be performed more easily and more efficiently, and contamination, dilution, and oversaturation may be limited or prevented. An improved rinsing within a chamber, while avoiding dilution, oversaturation, and/or contamination, is also a valuable advancement for processing substrates. Such a chamber gives flexibility of rinse recipe steps, substrate positions, simplification of rinsing frames (e.g. removal of catches and/or platforms for collecting rinse fluid), and flow rates to provide improved results without the concerns of dilution, contamination, and oversaturation of acid. After describing an exemplary chamber on which embodiments of the present technology may be coupled, the remaining disclosure will discuss aspects of the systems and processes of the present technology.

FIG. 1 shows a schematic perspective view of an electroplating system 100 for which methods and cleaning systems may be utilized and practiced according to embodiments of the present technology. Electroplating system 100 illustrates an exemplary electroplating apparatus including a system head 110 and a bowl 115. During electroplating operations, a wafer may be clamped to the system head 110, inverted, and extended into bowl 115 to perform an electroplating operation. Electroplating system 100 may include a head lifter 120, which may be configured to both raise and rotate the head 110, or otherwise position the head within the system including tilting operations. The head and bowl may be attached to a deck plate 125 or other structure that may be part of a larger system incorporating multiple electroplating systems 100, and which may share electrolyte and other materials. A rotor may allow a substrate clamped to the head to be rotated within the bowl, or outside the bowl in different operations. The rotor may include a contact ring, which may provide the conductive contact with the substrate. A seal 130 discussed further below may be connected with the head. Seal 130 may be configured to be coupled to a substrate for processing.

FIG. 1 illustrates an electroplating chamber that may include components to be cleaned directly on the platform. It is to be understood that other configurations are possible, including platforms on which the head is moved to an additional module and seal, or other component cleaning is performed. Additionally, one or more components, such as seal 130 may be removed from a respective chamber and placed in a maintenance system or cleaning system for cleaning. Any number of other operations may be performed that provide or expose a component for cleaning. An exemplary in situ rinse system 135 is also illustrated with the system 100 and will be described in further detail below.

Figure 2:
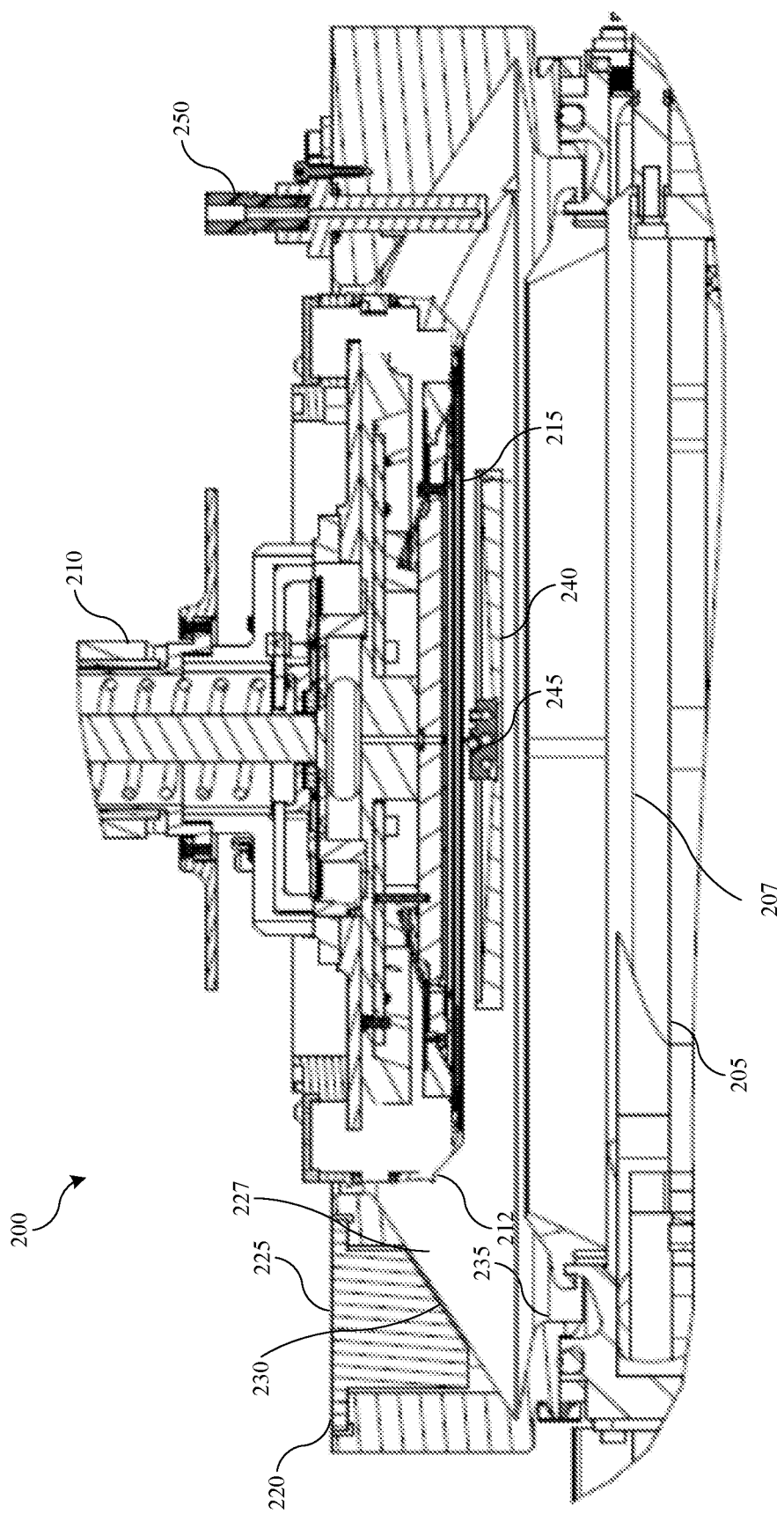
FIG. 2 shows a partial cross-sectional view of a chamber including aspects of a rinsing assembly according to embodiments of the present technology.

Turning to FIG. 2, a partial cross-sectional view of a chamber including aspects of an electroplating apparatus 200 according to some embodiments of the present technology is illustrated. The electroplating apparatus 200 may be incorporated with an electroplating system, including system 100 described above. As illustrated in FIG. 2, a plating bath 205 of an electroplating system is shown along with a head 210 having a substrate 215 coupled with the head. The substrate may be coupled with a seal 212 incorporated on the head in some embodiments. A rinsing frame 220 may be coupled above the plating bath vessel 205 and may be configured to receive the head into the vessel during plating. Rinsing frame 220 may include a rim 225 extending circumferentially about an upper surface of the plating bath vessel 205. A rinsing channel 227 may be defined between the rim 225 and an upper surface of the plating bath vessel 205. For example, rim 225 may be include interior sidewalls 230 characterized by a sloping profile. As described above, rinse fluid slung off a substrate may contact the sidewalls 230, and may be received in a plenum 235 extending about the rim for collection of the rinse fluid from the electroplating apparatus 200. However, as discussed above, it should be understood that, in some aspects, the rinse fluid/rinse agent may instead drain directly into the bath solution due to the unique formulation of the recycled rinse agent.

Electroplating apparatus 200 may additionally include one or more cleaning components in some embodiments. The components may include one or more nozzles used to deliver fluids to or towards the substrate 215 or the head 210. FIG. 2 illustrates one of a variety of embodiments in which rinse assemblies may be used to protect the bath and substrate during rinsing operations. As illustrated, a splash guard 240 is positioned between the substrate 215 and the plating bath vessel 205, and may be associated with a fluid nozzle 245, which may deliver a rinse fluid to substrate 215 in embodiments. Embodiments of the present technology may include fluid nozzle 245 along the splash guard 240 to a central location near a center of the wafer. The nozzle 245 may also be positioned a short distance from the substrate 215. Electroplating apparatus 200 may also include additional nozzles with nozzle 245 as will be explained further below. A side clean nozzle 250 may extend through the rim 225 of the rinsing frame 220 in some embodiments and be directed to rinse seal 212, along with aspects of substrate 215. However, it should be understood that other orientations of nozzles 245,250, and/or additional nozzles (not shown) are contemplated herein, as well as embodiments containing no splash guard 240. Namely, as noted above, by utilizing a unique rinse agent, the detrimental effects of dripping and sling off may be avoided without complex nozzle and splash guard orientations.

Nonetheless, seal cleaning may occur before, during, or after the substrate cleaning utilizing a rinse agent as discussed herein. As noted above, in embodiments, the same rinse agent or a different rinse agent may be used for both the seal and substrate cleaning, or the seal and substrate may be cleaned at different times using the same or a different rinse agent. For example, the system may include a seal clean nozzle coupled with the rinse frame. The seal clean nozzle may be positioned and operated to direct the rinse fluid tangentially across the seal and into the collection channel. The system may also perform a drying operation utilizing a gas nozzle. The gas nozzle may be coupled adjacent the fluid nozzle, and the methods may also include flowing an inert gas across the substrate to dry residual rinse fluid from a surface of the substrate.

Figure 3:
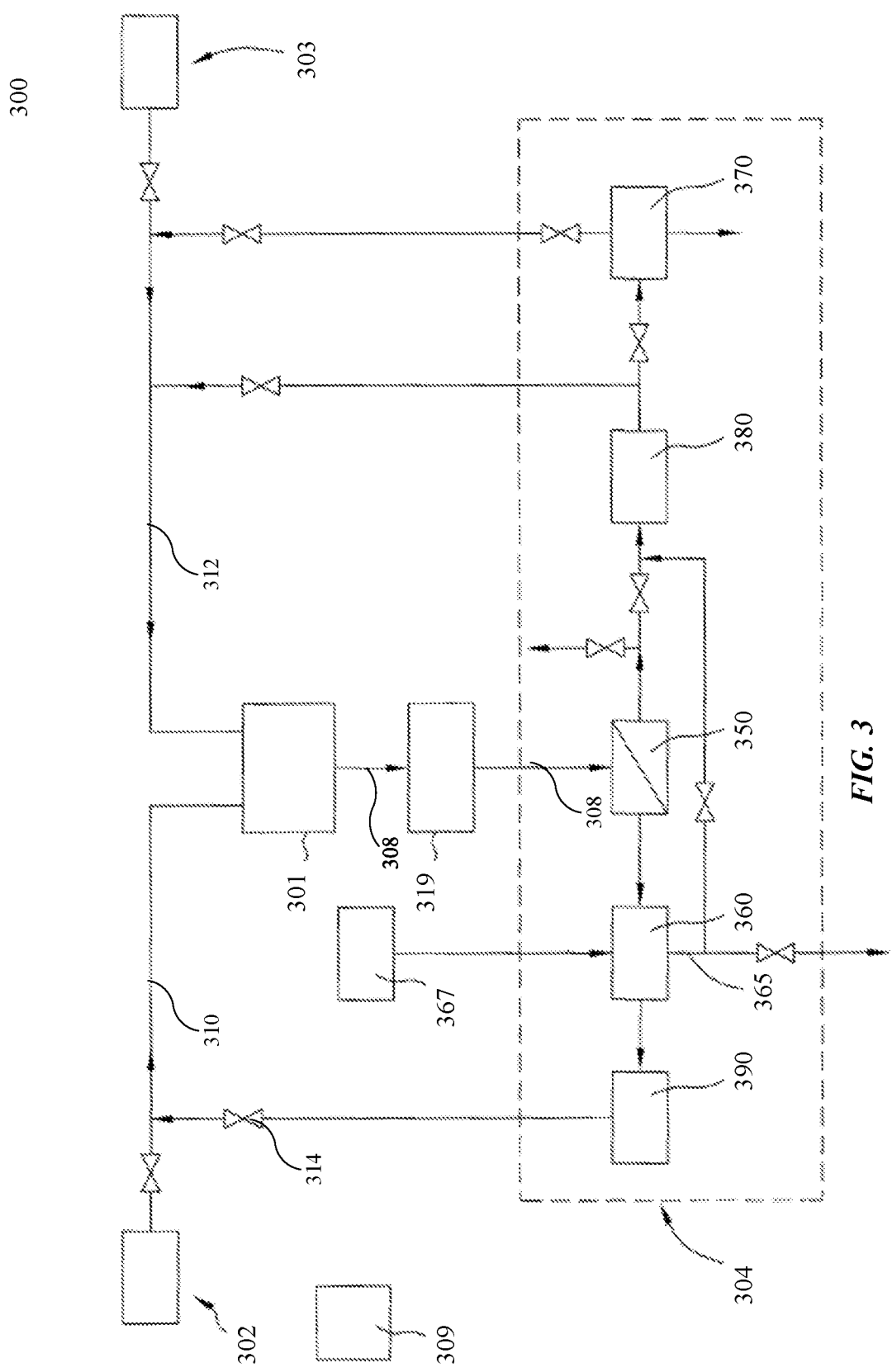
FIG. 3 is a schematic chart of an electroplating system according to embodiments of the present technology.
Figure 4:
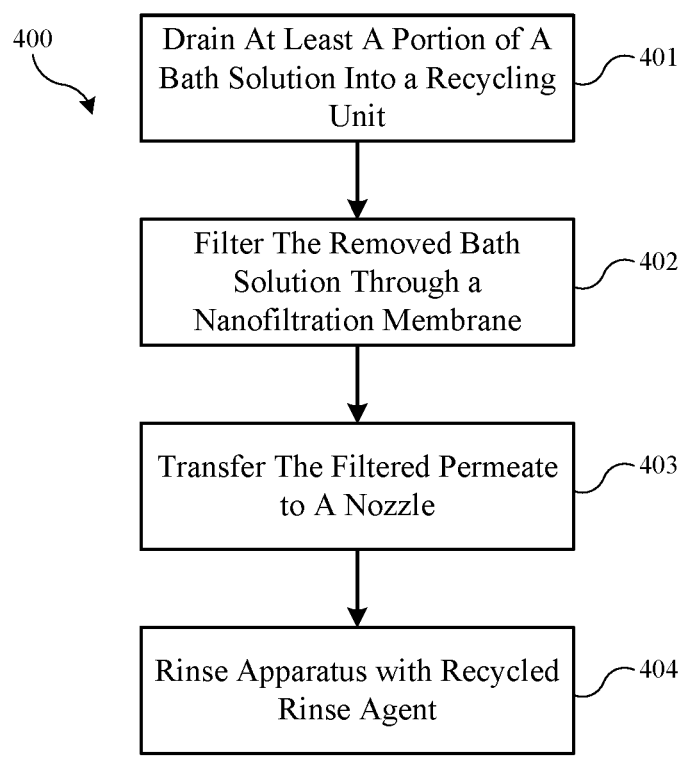
FIG. 4 illustrates exemplary operations in a method of rinsing an electroplating apparatus, component thereof, and/or a substrate according to embodiments of the present technology.

Regardless of the orientation of the bath utilized, FIG. 3 illustrates a schematic chart and FIG. 4 shows exemplary operations of an electroplating system 300 having a recycling unit 304 in accordance with an embodiment of the present technology. The electroplating system 300 may incorporate an electroplating system 100, and/or electroplating apparatus 200, or any one or more embodiments thereof. The electroplating system 300 may be configured to plate and/or clean one or more substrates as discussed above in regards to electroplating system 100 and/or electroplating apparatus 200.

The electroplating system 300 includes an electroplating apparatus 301 wherein substrates are electroplated and/or cleaned as discussed above. After electroplating, one or more rinses of the substrate may be carried out by spraying a rinse agent according to the present technology. For instance, the electroplating system 300 includes a bath and/or rinse source 302 connected to a bath of electroplating apparatus 301. The bath and/or rinse source 302 may include one or more tanks containing a plating solution and one or more pumps configured to supply the plating solution to the electroplating apparatus 301. As known in the art, the plating solution can contain an electrolyte and one or more precursor particles, as well as various optional components, such as chelating agents, pH adjusting agents, surfactants, and the like.

The electroplating system 300 also includes a rinse agent tank 303 connected to electroplating apparatus 301, such as to one or more nozzles (such as 250 in FIG. 2) for rinsing of the substrates and/or seal. The rinse agent tank 303 is also connected to the recycling unit 304 and filtration unit 350 for providing the rinse agent having the preselected pH, which will be discussed in greater detail below, to rinse agent tank 303.

In embodiments, the electroplating apparatus 301 may have a tank 319 fluidly connected downstream to the electroplating apparatus 301 via conduit 308 and configured to receive bath solution and used rinse agent drained from electroplating apparatus 301 at operation 401. However, as noted above, in embodiments, tank 319 may instead only be connected to drain 265 such that the spent rinse agent is collected in tank 319. Namely, as the rinse agent has a similar pH to the bath solution and does not contain excess cleaning chemicals, the bath solution does not need to be corrected after rinsing with a rinse agent as discussed herein. However, it should be understood that, in embodiments, both the rinse agent and bath solution may be drained into tank 319, together or separately (not shown). In embodiments, tank 319 may be coupled to multiple electroplating apparatus and configured to collect mixtures of used bath solution and/or rinse agent from multiple electroplating apparatus. Furthermore, in embodiments, tank 319 may be omitted, and the bath solution, rinse agent, or a combination thereof are drained directly to recycling unit 304.

For instance, in embodiments, the electroplating system 300 includes a recycling unit 304 that receives the solution (recycled bath solution, rinse agent, or a combination thereof) from the tank 319 or directly from electroplating apparatus 301 via conduit 308. The recycling unit 304 utilizes one or more filters to separate bath solutes from the bath solvent and/or rinse agent to provide a recycled rinse agent. In some embodiments, generally all of a bath solution may be drained into the recycling unit. However, in embodiments, less than or about 25 vol. % of the bath solution is drained for each rinsing cycle, such as less than or about 20 vol. %, such as less than or about 17.5 vol. %, such as less than or about 15 vol. %, such as less than or about 12.5 vol. %, such as less than or about 10 vol. %, such as less than or about 7.5 vol. %, such as less than or about 5 vol. %, based upon the volume of the bath solution prior to draining.

The recycling unit 304 can include an optional first filtration unit 350 having a filter size suited to separating any large particles from the solution. The optional first filtration unit 350 may also have a waste outlet that provides an exit for waste, such as large particles. The remaining solution is directed to a second filtration unit 360 designed to separate a liquid permeate from any remaining bath solutes (retentate). If necessary, the permeate may also be directed to an optional sanitization unit 380 and a treatment unit 370 to obtain reusable clean water.

The optional first filtration unit 350 may comprise a suitable filtering media for depth filtration and/or surface filtration. In one embodiment, the optional first filtration unit 350 includes one or more membranes or other filtration units configured to remove large particles having a size of greater than about 50 nm. In one embodiment, the membranes or other filtration units may be a microfiltration membrane, an ultrafiltration membrane, or other suitable size-exclusion filter. However, it should be understood that, in embodiments, the optional first filter is not necessary, as no large precipitates have been formed due to the similarity in pH between the recycled rinse agent and the bath solution pH. Thus, in embodiments, only a second filtration unit 360 may be utilized, as all of the collected retentate may(s) be returned to the bath solution.

The second filtration unit 360 is connected downstream to the optional first filtration 350 (if present) to receive the solution. In some embodiments, the second filtration unit is connected directly or indirectly to electroplating apparatus 301 via conduit 308. Nonetheless, at operation 402, the bath solution is filtered through a nanofiltration membrane at filtration unit 360.

The second filtration unit 360 is selected to retain substantially all electroplating precursor particles (discussed in greater detail below) present in the bath solution, such as greater than or about 85 wt. % of the precursor particles based upon the weight of precursor particles present in the drained bath solution, such as greater than or about 90 wt. %, such as greater than or about 92.5 wt. %, such as greater than or about 95 wt. %, such as greater than or about 97.5 wt. %, such as greater than or about 99 wt. % of the precursor particles are retained in the retentate by second filtration unit 360. Stated differently, in embodiments, the permeate contains less than or about 20 wt. % of precursor particles or ions thereof based upon the total weight of solutes in the permeate, such as less than or about 17.5 wt. %, such as less than or about 15 wt. %, such as less than or about 12.5 wt. %, such as less than or about 10 wt. %, such as less than or about 7.5 wt. %, such as less than or about 5 wt. %, such as less than or about 2.5 wt. %, or any ranges or values therebetween.

Nonetheless, in embodiments, the second filtration unit 360 includes a membrane or other filtering media and a pump to provide a pressure to the solution through the membrane. Namely, the present disclosure has surprisingly found that the use of a nanofiltration unit to separate the permeate from the retentate in recycled bath solution does not provide pure water as the retentate. Instead, by utilizing a nanofiltration unit, acidified water may form the permeate from the recycled bath solution.

Namely, in embodiments, the nanofiltration membrane may prevent molecules having weights of greater than or about 125 g/mol from passing through the membrane (remain in retentate), such as greater than or about 150 g/mol, such as greater than or about 175 g/mol, such as greater than or about 200 g/mol, such as greater than or about 225 g/mol, such as greater than or about 250 g/mol, such as up to about 300 g/mol, or any ranges or values therebetween, while allowing water and acid ions to pass through the membrane.

Additionally, or alternatively, the nanofiltration membrane may prevent particles having a size of greater than 1 nanometer from passing through the membrane.

In embodiments, the pressure provided to the solution may be greater than or about 50 psi, such as greater than or about 75 psi, such as greater than or about 100 psi, such as greater than or about 125, such as greater than or about 150 psi, such as greater than or about 175 psi, such as greater than or about 200 psi, such as greater than or about 225 psi, or any ranges or values therebetween.

As discussed above, by using a recycled rinse agent with a preselected pH, a rapid change in the bath solution pH can be avoided, and insoluble materials maintained in solution. For instance, in embodiments, less than or about 10 wt. % of the precursor particles precipitate from the bath solution subsequent the rinsing based upon the total weight of precursor particles in the bath solution prior to rinsing, such as less than or about 7.5 wt. %, such as less than or about 5 wt. %, such as less than or about 2.5 wt. %, or any ranges or values therebetween.

The electroplating apparatus, a component thereof, the substrate, or a combination thereof may define a surface area. In embodiments, less than or about 10% of the surface area contains an oxide of a precursor particle formed thereon, based upon the total surface area, such as less than or about 7.5%, such as less than or about 5%, such as less than or about 2.5%, such as less than or about 1%, or any ranges or values therebetween. Stated differently, in embodiments, a system according to the present disclosure may drastically reduce plate-up as compared to an identical system that does not utilize a recycled rinse agent according to the present technology. Such as, in embodiments, the present technology may have greater than or about 50% less plate up, such as greater than or about 60%, such as greater than or about 70%, such as greater than or about 80%, such as greater than or about 90% less plate up, or any ranges or values therebetween.

The pH of the bath solution can be measured according to known techniques, such as use of a pH meter in the range of 15 to 40 degree Celsius solution for example only, to obtain a bath solution pH value, and the pH of the recycled rinse agent may be filtered, as discussed, to obtain a second pH value, which may be the same as the first pH value (bath solution pH value) or different, according to the above values. Nonetheless, the present technology has surprisingly found that by utilizing a nanofiltration member as a filtration system as discussed herein, the permeate forms a recycled rinse agent having a pH of less than or about 6, such as less than or about 5, such as less than or about 4.5, such as less than or about 4, such as less than or about 3.5, such as less than or about 3, such as less than or about 2.5, such as less than or about 2, such as less than or about 1.5, such as less than or about 1, or any ranges or values therebetween.

For instance, the pH of the recycled rinse agent after filtration (e.g. the permeate from the second filtration unit 360) may have a pH that varies from the bath solution pH by less than or about 40%, such as less than or about 35%, such as less than about 30%, such as less than or about 25%, such as less than or about 20%, such as less than or about 15%, such as less than or about 10%, such as less than or about 10%, such as less than or about 5%, such as less than or about 2.5%, such as less than or about 1%, or any ranges or values therebetween. Thus, in embodiments, the pH of the bath solution and the pH of the recycled rinse agent may be substantially the same.

In embodiments, the pH of the recycled rinse agent may vary from the pH of the bath solution by a pH value of about 5 or less, such as about 4.5 or less, such as about 4 or less, such as about 4.5 or less, such as about 3 or less, such as about 2.5 or less, such as about 2 or less, such as about 1.5 or less, such as about 1 or less, such as about 0.5 or less, such as about 0.2 or less, or any ranges or values therebetween. For instance, in embodiments, when the recycled rinse agent pH is from about 0 to about 5, such as about 0.5 to about 4.5, such as about 1 to about 4, or any ranges or values therebetween, the bath pH is also from about 0 to about 5, such as about 0.5 to about 4.5, such as about 1 to about 4, or any ranges or values therebetween. Additionally, or alternatively, when the first pH is from about 8 to about 12, such as about 8 to about 11, such as about 8.5 to about 10, or any ranges or values therebetween, the second pH is from about 8 to about 12, such as about 8 to about 11, such as about 8.5 to about 10, or any ranges or values therebetween.

In embodiments, the pH of the bath solution, recycled rinse agent, or a combination thereof, may be selected based upon the precursor particles in solution. Namely, as known in the art, some plating materials, such as tin silver (SnAg) have increased likelihood of plate-up of insoluble particles and may therefore require a very low pH (such as less than or about 3) of the bath solution, recycled rinse agent, or both, to increase solubility and prevent insoluble deposits. Nonetheless, as would be understood by one having skill in the art, non-limiting metals (or ions thereof) that may be included in the bath solutions and for which recycled rinse agents as discussed herein are suitable for cleaning from substrates and/or seals include copper, tin, gold, nickel, silver, palladium, platinum, and rhodium, and alloys such as noble metal alloys, tin-copper, tin-silver, tin-silver-copper, tin-bismuth, permalloy and other nickel alloys, lead-tin alloys, and other lead-free alloys, and can be utilized in a plating system having any one or more of the above pH values or ranges.

Moreover, in embodiments, the recycled rinse agent may contain the recycled rinse agent and a solvent. In embodiments, the solvent may be the same solvent contained in the bath solution, such as water (deionized water), in some embodiments. Selecting a pH of the recycled rinse agent and/or bath solution may include selecting a type of recycled rinse agent and/or bath electrolyte. In embodiments, the recycled rinse agent is a mineral acid, such as an acid derived from an inorganic compound. Non-limiting examples of suitable mineral acids include hydrogen bromide (BrH), hydrogen iodide (HI), hydrochloric acid (HCl), nitric acid ($HNO_3$), nitrous acid ($HNO_2$), phosphoric acid ($H_3PO_4$), sulfuric acid ($H_2SO_4$), boric acid ($H_3BO_3$), hydrofluoric acid (HF), hydrobromic acid (HBr), perchloric acid ($HClO_4$), hydroiodic acid (HI), carbonic acid, and combinations thereof. In embodiments, organic acids such as alkylsulfonic acids, e.g., methane sulfonic acid (MSA) is a suitable replenishment agent in accordance with the present disclosure. In embodiments, organic acids provide pH control as described herein, but also act as chelating agents sufficient for bonding with species in solution which, if not chelated, may promote the formation of plate-up films. Nonetheless, in embodiments, the recycled rinse agent may have a lower volume or be more concentrated that necessary for rinsing. Thus, in embodiments, the recycled rinse agent may be diluted with a solvent, such as DI water, prior to a rinsing step. However, it should be clear that the recycled rinse agent still exhibits the above pH properties prior to rinsing.

Nonetheless, after filtration through second filtration unit 360, the permeate may be transferred to one or more nozzles 250 at operation 403 via conduit 310. Furthermore, at operation 404, the transferred permeate is utilized for rinsing a further substrate and/or seal (see, e.g., FIG. 2), or may instead be transferred to bath 205 for replacement of any lost volume. In embodiments, the recycling unit 304 may be separate from any additional supply or return lines due to the high pressure needed for operation of the nanofiltration membrane. Nonetheless, in embodiments, the second filtration unit 360 may be configured to provide at least about 50 mL of recycled rinse agent per rinse cycle, such as greater than or about 75 mL, such as greater than or about 100 mL, such as greater than or about 250 mL, such as greater than or about 300 mL, such as greater than or about 350 mL, such as greater than or about 360 mL, such as greater than or about 370 mL, such as greater than or about 500 mL, such as greater than or about 750 mL, such as greater than or about 1000 mL, such as greater than or about 1500 mL, such as up to about 2000 mL, or any ranges or values therebetween.

Surprisingly, the present technology has found that the benefits discussed herein are obtained even when a secondary rinse is conducted with a neutral pH rinse agent. Without wishing to be bound by theory, it is believed that the precursor particles are rinsed with the recycled rinse agent according to the present technology, and thus avoid precipitation in the bath due to the similarity in pH between the recycled rinse agent and the bath pH. Thus, a secondary rinse, which may be utilized to rinse extra rinse agent, or the like, may be conducted with a neutral pH rinse agent without causing undesirable precipitation. Therefore, in embodiments, methods according to the present technology may include a secondary rinsing step. The secondary rinsing step can be conducted with a recycled rinse agent according to the present technology, or a neutral pH rinse agent as known in the art, such as DI water.

In embodiments, the retentate, which may contain any one or more of the precursor particles discussed above, may be returned to the bath 205 via conduit 312 for further electroplating operations. In addition, due to the preselected pH of the recycled rinse agent, the precursor particles can be recovered in their native state, as the particles remain unoxidized and maintained in the dissolved stated (e.g., not precipitated out of solute). Thus, the use efficiency of precursor particles can be greatly improved.

Nonetheless, if necessary, the second filtration unit 360 may be cleaned by backward flush to remove waste and surplus solution. The solution may exit the second filtration unit 360 through a waste output 365 or will be fed to the treatment unit 370. In embodiments, the second filtration unit 360 can include a dosing unit 367 that may contain one or more pH adjusting agents for maintaining the pH of the recycled rinse agent in the second filtration unit 360 within the ranges set forth above of the bath solution pH.

In embodiments, pH adjusting agents may be provided in any amount necessary to obtain a desired pH value in the final composition of the recycled rinse agent. Acidic pH adjusting agents can be organic acids, including amino acids, and inorganic mineral acids. Non-limiting examples of acidic pH adjusting agents include acetic acid, citric acid, fumaric acid, glutamic acid, glycolic acid, hydrochloric acid, lactic acid, nitric acid, phosphoric acid, sodium bisulfate, sulfuric acid, and the like, and combinations thereof. In embodiments, all organic acids are contemplated for use as pH adjusting agents. Non-limiting examples of alkaline pH adjusting agents include alkali metal hydroxides, such as sodium hydroxide, and potassium hydroxide; ammonium hydroxide; organic bases; and alkali metal salts of inorganic acids, such as sodium borate (borax), sodium phosphate, sodium pyrophosphate, and the like, and mixtures thereof.

In embodiments, an optional sanitization unit 380 is included. When utilized, the sanitation unit 380 may remove organic species from the solution, such as permeate from the first filtration unit 350 and/or second filtration unit 360. In embodiments, the sanitization unit 380 may be an ultraviolet (UV) unit configured to oxidize the organic species in the water stream. In more embodiments, the sanitization unit 380 is configured to reduce and control bacteria counts. An optional treatment unit 370 may purify and/or deionize the water stream. In one embodiment, the treatment unit 370 may be a reverse osmosis membrane for a reverse osmosis filtration. In embodiments, the treatment unit 370 may comprise an ion-exchange resin, which may be continuously regenerated, to deionize the permeate. In more embodiments, the treatment unit 370 may be both a reverse osmosis membrane and an ion-exchange resin. The permeate from the treatment unit 370 may therefore result in ultra-purified water when used. However, as stated above, in embodiments, no additional filtration is necessary outside of second filtration unit 360.

In one embodiment, the electroplating system 300 can include a system controller 309. The system controller 309 may control one or more valves 314 in the electroplating system 300 to insure that recycled rinse agent and/or bath solution is delivered or shut off at desired time. For simplicity of drawing, connections between the system controllers 309 and the components of the electroplating system 300 are not shown. In embodiments, the system controller 309 is a standalone independent controller for supplying and recycling rinse agent. In another embodiment, the system controller 309 is integrated into an electroplating system 300 an integral part.

Although the above discussed embodiments utilize real-time monitoring and adjustments of the replenishment agent, various alternatives may be employed according to the technology described herein. For example, the recycling unit 304 may be controlled manually by an operator observing the output pH and volume values. For instance, the system software of the system controller 309 allows for both an automatic real-time adjustment mode as well as an operator (manual) mode. Further, although a single controller is shown in FIG. 3, multiple controllers may be used to operate various constituents of the system such as the chemical recycling unit 304, the first filtration unit 350, and the second filtration unit 360. Other embodiments will be apparent to those skilled in the art.

Nonetheless, it should be understood that, in embodiments, the method according to the present disclosure includes a non-transitory computer readable medium having instructions stored thereon that, when executed, cause recycling of all or a portion of a bath solution. For instance, in embodiments, a non-transitory computer readable medium may execute any one or more operations of the method, such as executing measurement of pH, comparing pH, filtering the solution to form the recycled rinse agent, and/or returning the retentate and/or permeate to the bath or rinse systems.

Embodiments of the above-described systems and chambers may be present in a plating chamber that exhibits reduced contamination, dilution, and oversaturation of acid. The method 400 may also include one or more operations prior to the initiation of the method, including filing, plating, solute adjustment, or any other operations that may be performed prior to the described operations. The method may further include a number of optional operations, which may or may not be specifically associated with some embodiments of methods according to the present technology. For example, many of the operations are described in order to provide a broader scope of the processes performed but are not critical to the technology or may be performed by alternative methodology, as will be discussed further below.

Method 400 may include various optional operations described schematically in regards to FIGS. 1 to 3, as discussed above. For instance, as discussed above, the electroplating apparatus may include a movable head that is capable of moving from a first position to a second position in order to dispose substrate 215 and/or seal 130 within contact of bath solution 207. After removing the substrate 215 and/or seal 130 from the plating solution 207, the method includes rinsing the substrate 215 and/or seal 130 with the recycled rinse agent discussed herein. Furthermore, it should be noted that the transition from the first position to the section position may occur multiple times, with rinsing between each cycle, in embodiments.

In the preceding description, for the purposes of explanation, numerous details have been set forth in order to provide an understanding of various embodiments of the present technology. It will be apparent to one skilled in the art, however, that certain embodiments may be practiced without some of these details, or with additional details. For example, other substrates and semiconductor apparatus that may benefit from the rinse techniques described may also be used with the present technology.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the outlet" includes reference to one or more outlets and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A method for rinsing an electroplating apparatus, a component thereof, and/or a substrate, comprising:
   draining at least a portion of a bath solution having a first pH from an electroplating bath to a recycling unit;
   filtering the drained bath solution through a nanofiltration membrane, forming a permeate containing a recycled rinse agent and a retentate;
   transferring the recycled rinse agent to one or more nozzles; and
   rinsing the electroplating apparatus, the component thereof, or the substrate with the recycled rinse agent;
   wherein the nanofiltration membrane is selected to produce the recycled rinse agent is characterized by a second pH, wherein the second pH varies from the first pH by less than or about 5 without additional pH adjusting agents.

2. The method of claim 1, wherein the retentate contains one or more electroplating precursor particles.

3. The method of claim 2, wherein the precursor particles are copper, tin, gold, nickel, silver, palladium, platinum, rhodium, alloys thereof, ions thereof, or mixtures thereof.

4. The method of claim 3, wherein the precursor particles are one or more ions of tin, tin-copper, tin-silver, tin-silver-copper, tin-bismuth, palladium, or combinations thereof.

5. The method of claim 2, wherein less than or about 10 wt. % of the precursor particles precipitate from the bath solution subsequent the rinsing, based upon the weight of the precursor particles in the bath solution prior to rinsing.

6. The method of claim 1, further comprising a second rinsing of the electroplating apparatus, the component thereof, or the substrate, wherein the second rinsing comprises the recycled rinse agent or water.

7. The method of claim 2, further comprising returning at least a portion of the electroplating precursor particles to the electroplating bath.

8. The method of claim 1, wherein the filtering occurs at a pressure of greater than or about 50 psi.

9. The method of claim 8, wherein the nanofiltration membrane is characterized by preventing molecules having a molecular weight of greater than or about 125 g/mol from passing through the nanofiltration membrane.

10. The method of claim 8, wherein the nanofiltration membrane is characterized by preventing particles having a size of greater than 1 nanometer from passing through the nanofiltration membrane.

11. The method of claim 1, wherein the first pH is from about 0 to about 5, and wherein the second pH is from about 0 to about 5.

12. The method of claim 1, wherein the second pH varies from the first pH by less than or about 3.

13. The method of claim 12, wherein the second pH varies from the first pH by less than or about 2.

14. The method of claim 1, wherein the recycled rinse agent and the bath solution comprise a mineral acid, carbonic acid, or a combination thereof.

15. The method of claim 1, wherein the recycled rinse agent is characterized by a pH of less than 3.

16. The method of claim 2, wherein the permeate contains less than or about 20 wt. % precursor particles or ions thereof, based upon the total weight of solute in the permeate.

17. An electroplating system comprising,
    a plating system comprising a plating bath containing a bath solution, a head comprising a seal, a substrate coupled with the seal, and at least a first rinse nozzle, wherein the bath solution is characterized by a first pH;

a recycling unit comprising at least a first filtration unit and a pump, the first filtration unit being characterized by a nanofiltration membrane;

a recycling unit conduit fluidly connecting the plating bath and the recycling unit;

a first filtration unit retentate conduit connecting the recycling unit to the plating bath; and a first filtration unit permeate conduit connecting the recycling unit to the at least a first rinse nozzle, wherein the nanofiltration membrane is selected to produce the permeate is characterized by a second pH, wherein the second pH varies from the first pH by less than or about 5 without additional pH adjusting agents.

18. The system of claim 17, further comprising at least one valve on one or more of the recycling unit conduit, first filtration unit permeate conduit, first filtration unit retentate conduit.

19. The system of claim 17, wherein the system further comprises a controller, and a non-transitory computer readable medium having instructions stored thereon.

20. A method for rinsing an electroplating apparatus, a component thereof, and/or a substrate, the electroplating apparatus comprising a plating bath containing a bath solution, a head comprising a seal, a substrate coupled with the seal, and at least a first rinse nozzle, the method comprising:

moving the head from a first position to a second position;

removing at least a portion of a bath solution having a first pH from an electroplating bath;

filtering the bath solution through a nanofiltration membrane, forming a permeate containing a recycled rinse agent and a retentate;

transferring the recycled rinse agent to one or more nozzles; and rinsing the head, the seal, or a combination thereof;

wherein the nanofiltration membrane is selected to produce the recycled rinse agent is characterized by a second pH, wherein the second pH varies from the first pH by less than or about 5 without additional pH adjusting agents.

* * * * *